March 3, 1964 C. LAUXEN ETAL 3,123,677

MAGNETIC RECORDING SYSTEM

Filed July 8, 1957 4 Sheets-Sheet 1

INVENTORS.
Carl Lauxen,
Martin L. Levene
& David L. Nettleton
BY Morris L. Rabkin
ATTORNEY.

INVENTORS.
Carl Lauxen,
Martin L. Levene
& David L. Nettleton
BY Morris Rabkin
ATTORNEY.

March 3, 1964 C. LAUXEN ETAL 3,123,677

MAGNETIC RECORDING SYSTEM

Filed July 8, 1957 4 Sheets-Sheet 3

INVENTORS.
Carl Lauxen,
Martin L. Levene
& David L. Nettleton

BY Morris ... [signature]

ATTORNEY.

INVENTORS.
Carl Lauxen,
Martin L. Levene
& David L. Nettleton
BY
Morris Rabkin
ATTORNEY.

United States Patent Office 3,123,677

Patented Mar. 3, 1964

3,123,677

MAGNETIC RECORDING SYSTEM

Carl Lauxen, Haddonfield, N.J., Martin Lewis Levene, Philadelphia, Pa., and David L. Nettleton, Haddonfield, N.J., assignors to Radio Corporation of America, a corporation of Delaware Filed July 8, 1957, Ser. No. 670,525
7 Claims. (Cl. 179—100.2)

The present invention relates to recording systems, and particularly to magnetic recording systems wherein it is desirable to maintain a predetermined positional relationship between the magnetic recording medium and the magnetic transducer which scans the medium to record and reproduce signals thereon.

Some of the advantages of magnetic recording systems are that high fidelity of recording and reproduction is obtainable and that a record can be produced which may either be reused or permanently retained in accordance with the desires of the user. Both long life and high fidelity of signal reproduction are obtained by virtue of the inherent nature of the magnetic recording process which depends upon the magnetization of a permanently magnetizable recording medium, rather than any irreparable change in the physical characteristics of a recording medium. A magnetic transducer, nominally referred to as a magnetic head, must only be in magnetic contact with the recording medium during magnetic recording or reproduction. It is not necessary, in the magnetic recording process, for the magnetic head to be in physical contact with the recording medium. However, most available magnetic recording equipment provides for physical contact between the magnetic head and the recording medium. Such physical contact, while providing for satisfactory operation, shortens the life of the magnetic head and the recording medium since considerable wear results from the contact of the head with the moving recording medium. When the recording medium must move at high speeds with respect to the magnetic head, such as in cases where the magnetic recording medium is a disc or drum structure, physical contact between the head and the recording medium produces undesirable strain on guides, bearings and other elements which support the recording medium.

While it has been desirable to space the magnetic head from the magnetic recording medium to avoid frictional contact and reduce wear, it is necessary to maintain a constant spacing between the head and the recording medium, regardless of any spurious movements therebetween tending to alter the spacing, as might be caused by mechanical irregularities. In order to obtain such constant spacing between the head and the recording medium, it would be necessary to provide for extreme accuracy in the mechanism for guiding and driving the magnetic recording medium so as to prevent any movement of the medium which would change the spacing. Furthermore, it is difficult to eliminate the existence or formation of undulations in the surface of the recording medium itself. Tolerances necessary in construction of mechanical parts and the recording medium would then be so high as to make a magnetic recording system utilizing such elements economically unfeasible.

It has been suggested in the prior art to provide an expanding low pressure air stream emanating from the magnetic head and directed upon the moving recording medium, such that the air moving against the magnetic recording medium tends to maintain a predetermined clearance between the head and the recording medium.

It is difficult to obtain a sufficiently close spacing between the magnetic head and the recording medium merely by means of directing a stream of air from the head onto the medium as suggested in the art. Moreover, when there is a tendency for a change in the spacing between the head and the recording medium due to some irregularity in the recording medium or the mechanism for carrying the recording medium, it is desirable, particularly with rapidly moving magnetic recording mediums, to immediately restore the proper spacing. Close spacing between the magnetic head and the recording medium is desirable in that signals of smaller amplitude can be both recorded on the medium and reproduced therefrom, than would be possible with large spacing. Moreover, the area of recording medium required to record a signal is dependent upon the distance between the magnetic head and the recording medium because of the characteristics of the magnetic field established by the magnetic head. Thus, it is desirable to maintain close spacing for maximum utilization of the recording medium.

The present invention provides for reduced spacing between the recording medium and the magnetic heads and simultaneously maintains such spacing and compensates for any motion of the recording medium away from the head due to surface irregularities therein as well as wobble, runout or any other mechanical imperfections in the recording mechanism. A magnetic recording system using the present invention is capable of operation with signals of smaller amplitude than heretofore possible. In information handling equipment, it is desirable to record pulse signals in close proximity to each other on the magnetic recording medium. The information handling capacity of a magnetic recording medium is determined by the proximity or packing of the pulse signals. By decreasing the spacing between the magnetic head and the recording medium in accordance with the invention, it is possible to increase the number of pulse signals which can be packed and, therefore, the density of information stored on a magnetic recording medium.

Briefly described, the present invention provides a film of a fluid medium such as air, between the magnetic head and the surface of a cooperating recording medium for separating the magnetic head from the recording medium. A similar fluid medium is used to apply forces between the head and recording medium for compressing the film of air so as to provide the desired close spacing between the head and the recording medium.

In accordance with the invention, a novel structure for supporting the magnetic head may be provided. This structure is adapted to support the head for movement toward and away from the magnetic recording medium. The front surface of the support structure is disposed opposite from the surface of the recording medium. The portion of the magnetic head effective to record and reproduce signals is exposed from the front surface of the support structure for cooperation with the recording medium. The support structure also has a back surface. An orifice is provided in the support structure and may extend from the back to the front surface thereof. A fluid medium, such as air, is exhausted under pressure through the orifice and against the surface of the recording medium. A cushion or film of the fluid medium is provided between the front surface of the support structure and the surface of the recording medium. The escaping fluid is exhausted between the front surface of the head support structure and the surface of the recording medium at a sufficient pressure to exert oppositely directed forces against the recording medium and the head support structure. These forces tend to separate the head from the support structure. Simultaneously, a stream of the fluid medium is applied to the back surface of the head support structure; thus, applying forces to advance the structure toward the surface of the recording medium. The dimensions of the surfaces and the pressure of the fluid medium are selected such that, when the front surface of the head support structure is spaced from the surface of the recording medium by a small predetermined distance, the forces on the opposite surfaces of the head support structure will be in equilibrium. Should the distance between the recording medium and the head support structure tend to increase or decrease, this equilibrium condition will be altered. The head support structure, then, is displaced toward or away from the magnetic recording medium until the predetermined spacing therebetween is reestablished. Such restoration of equilibrium is accomplished over a negligible time interval.

It is therefore an object of the present invention to provide an improved magnetic recording system.

It is a further object of the present invention to provide, in a magnetic recording system, apparatus whereby a magnetic record transducer may be maintained physically separated from a magnetic recording medium, but in intimate magnetic contact therewith.

It is a still further object of the present invention to provide an improved magnetic recording system wherein the magnetic record transducer may be spaced from the surface of a cooperating magnetic recording medium by shorter distances than heretofore possible so that the system will be capable of operating with signals of very small amplitude.

A still further object of the present invention is to provide an improved magnetic recording system wherein magnetic head to magnetic recording medium contact is eliminated and wherein pulse signals may be recorded on the medium in close proximity to each other.

The above mentioned and other objects and advantages of the present invention will, of course, become apparent and immediately suggest themselves to those skilled in the art to which the invention is directed from a reading of the following description in connection with the accompanying drawings in which.

Figure 1:
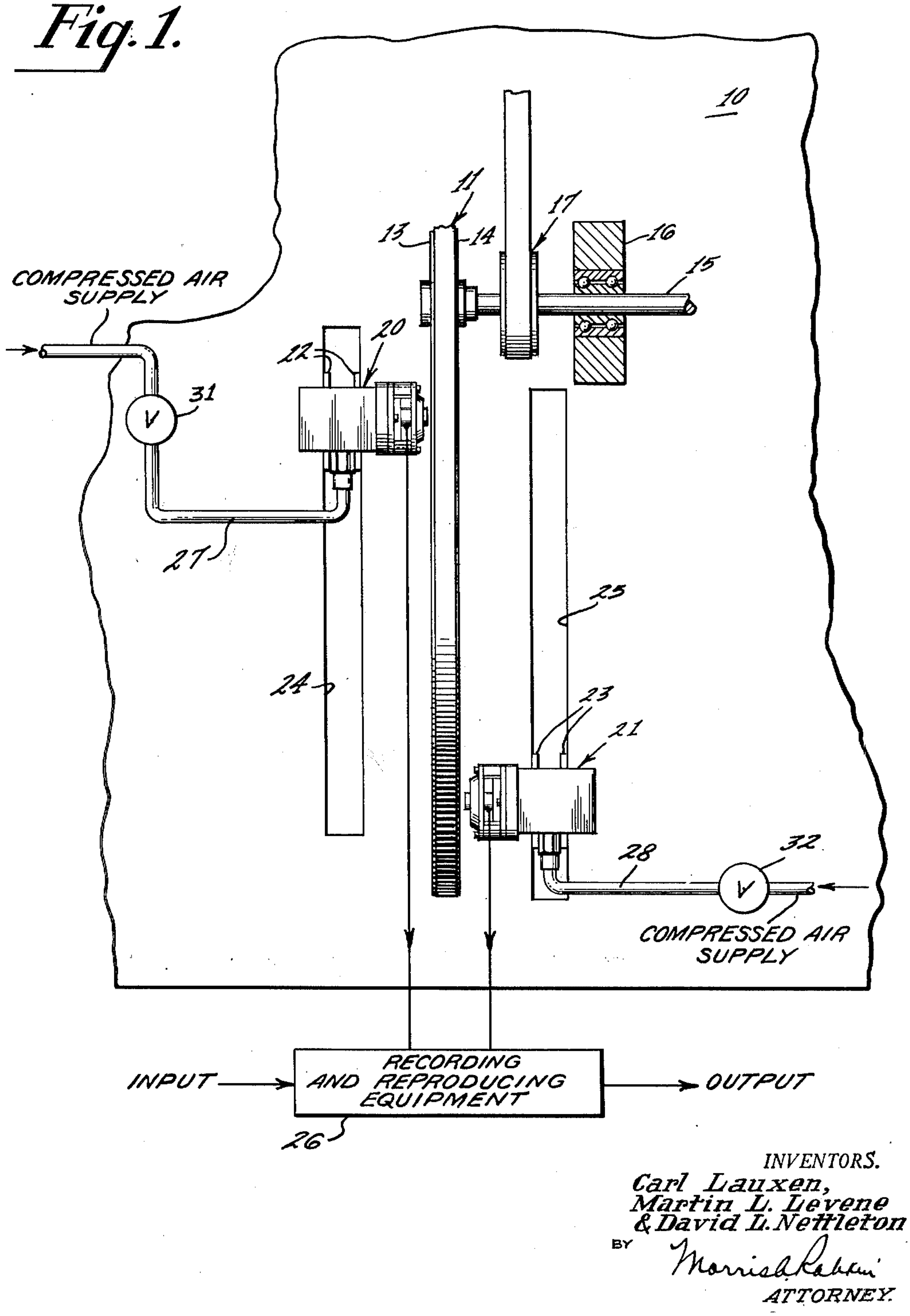
FIGURE 1 is a plan view presenting a fragmentary and diagrammatical showing of a magnetic recording and reproducing system constructed in accordance with an illustrative embodiment of the present invention.

FIGURE 1 represents a system for recording information on a magnetic disc record in accordance with the invention. While magnetic disc records are shown in connection with this and other illustrated embodiments of the present invention, it will be understood that other forms of magnetic recording mediums may be alternatively used. For example, the present invention may be applied in magnetic recording systems using magnetic drum records, magnetic tape records, or magnetic card records. When magnetic tape records are used, it may be desirable to provide a rigid, non-magnetic backing structure opposite from the magnetic head. The magnetic tape record will pass between the non-magnetic backing structure and the magnetic head.

In FIGURE 1, a support panel 10 is shown on which the various components of the illustrated apparatus are located. A magnetic disc record 11 which may be a non-magnetic disc coated on the opposite surfaces thereof with permanently magnetizable magnetic material, is fragmentarily shown. The coatings provide the recording surfaces 13 and 14 for the magnetic disc record. The record is fastened to a shaft 15, which is supported in a bearing 16. The shaft 15 is rotated by a belt and pulley arrangement 17. Other bearings are provided for support of the shaft and a motor is used to rotate the belt at a constant speed. The other bearings and motor drive arrangement are not shown, since they may be conventional. It will be appreciated that, due to slight in accuracy in mechanical construction, the disc 11 will not run absolutely true. Even if the mechanical tolerances allowed in the construction of the shafts, pulleys and bearings were very high, it would be practically impossible to prevent a small amount of wobble, undulations and other dynamic variations in the motion of the disc record 11.

In order to maintain a close spacing between magnetic heads for recording and reproducing information signals on the magnetic disc record in spite of any degree of irregularity in the motion of the disc record, magnetic head support devices 20 and 21 are provided. These devices 20 and 21 serve to position magnetic heads in spaced relation to the recording surfaces of the disc record, and particularly with the heads separated from the record by a predetermined small distance. The devices 20 and 21 operate to compensate for any irregularity in the motion of the disc rceord and to maintain the predetermined small separation between the recording surfaces and the heads. These magnetic head support devices 20 and 21 are mounted to slide within slots or guides 24 and 25 in the panel 10. Therefore, the magnetic heads may be located to record or reproduce from any radially disposed channel on the opposite sides of the disc record 11. Although only two magnetic head support devices 20 and 21 are shown, it will be appreciated that any number of such devices can be disposed at different radial and peripheral locations with respect to the disc record. The use of two magnetic recording surfaces permits twice the number of recording channels to be available, than would be available with a single sided disc record.

Recording and reproducing equipment 26 is connected to each of the heads. Such equipment may be conventional and input as well as output signals can be alternatively derived therefrom. If desired, the same or different signals can be recorded with each of the heads. Disc recording systems such as the system illustrated in the drawings are especially useful in the recording of digital information, or other information which may be represented as pulse signals. The disc record would therefore serve as a memory device. In many memory devices, it is highly desirable to store as much information as possible on a record member so as to increase the information storage capacity of the memory unit. With the present invention, the density of storage of information signals; that is, the packing of pulse signals on the magnetic record, may be greater than possible than with previously known magnetic recording system. Greater information storage density is provided by virtue of the closer head to recording surface spacing possible with equipment constructed in accordance with the invention. In obtaining such close spacing, the magnetic head support devices 20 and 21 make use of compressed air which has been found to be suitable in the illustrated apparatus. It may be desirable in practicing the invention, to make use of other fluid mediums, which may or may not be as compressible as air, such for example, as oils and aqueous solutions. The compressed air is supplied to the devices 20 and 21 by means of conduits 27 and 28 which connect the devices to conventional compressed air supply sources (not shown). The valves 31 and 32 are included in the conduits 27 and 28 in order to control the flow of compressed air. While compressed air has been mentioned as a suitable medium for use with the head support devices 20 and 21, it will be appreciated that any similar fluid medium will also be suitable.

Figure 2:
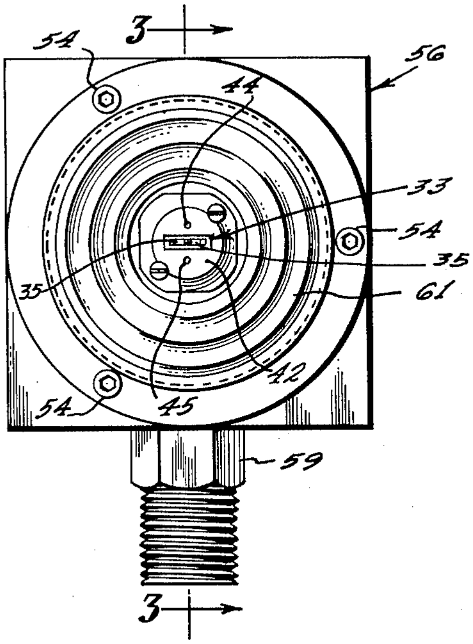
FIGURE 2 is an end view of a device for supporting a magnetic head which is constructed in accordance with an embodiment of the present invention.
Figures 3, 4:
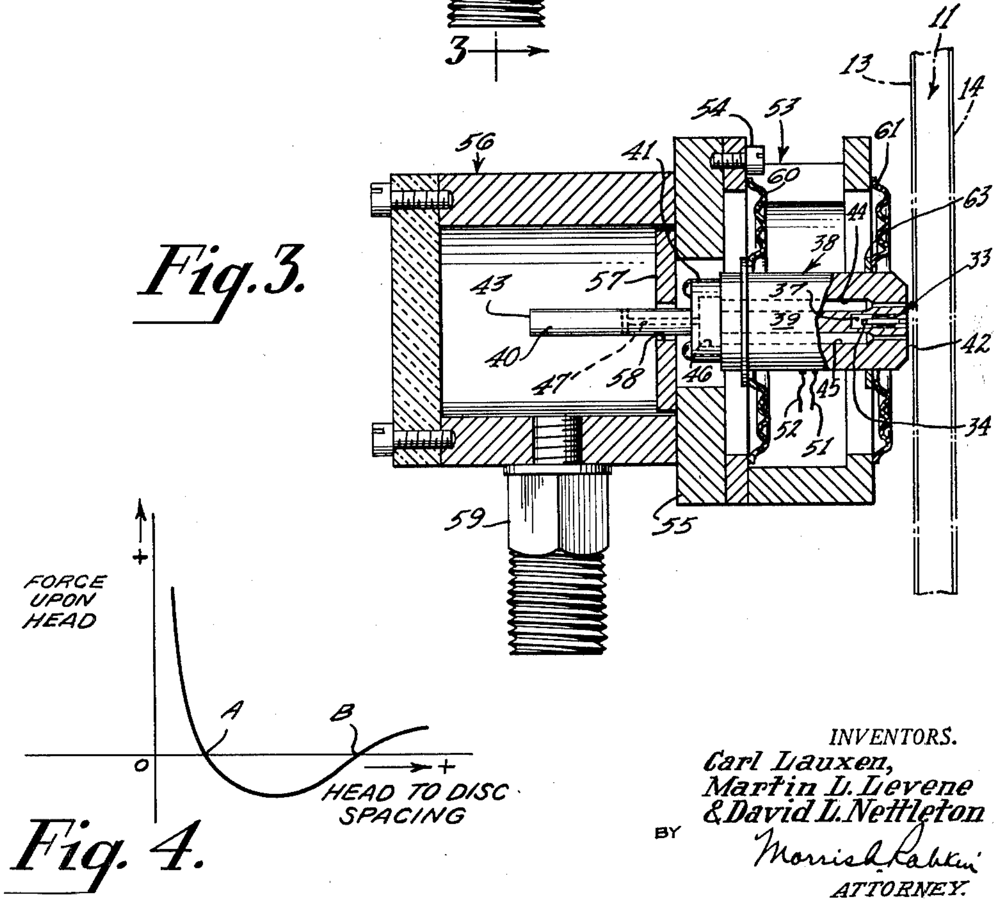
FIGURE 3 is a sectional plan view of the magnetic head supporting device shown in FIGURE 2, the section being taken along the line 3—3 of FIGURE 2, when viewed in the direction of the arrows.
FIGURE 4 is a curve showing the displacement characteristics resulting from the exhaustion of compressed air between the surface of a magnetic head and a surface of a cooperating recording medium disposed adjacent to the head.

A magnetic head support device constructed in accordance with an embodiment of the present invention is illustrated in FIGURES 2 and 3. The disc record 11 having recording surface coatings 13 and 14 is shown in a fragmentary phantom view in FIGURE 3. A magnetic head 33 is constituted of a laminated core 34 having pole portions 35 which form a signal gap therebetween. A housing 38 for containing the magnetic head 33 is provided. The magnetic head 33 is disposed within a recess 37 in the housing 38. The housing 38 is a unitary structure constituted of a front section 39 and a rear section 40 which are fastened together at an intermediate section 41. The housing 38 may be constructed from aluminum, magnesium, or some other light non-magnetic material. The opposite end surfaces of the housing 38 may be designated as the front surface 42 and the rear surface 43 thereof. The front surface 42 has a larger surface area than the rear surface for reasons to be brought out hereinafter. The front surface 42 is disposed opposite the recording surface 13 of the record disc 11. The pole portions 35 of the magnetic head 33 are exposed from the housing 38 at the front surface 42 for cooperation with the record disc 11. The housing 38 may be constructed from one piece of material. However, it may be more desirable to construct the various portions 39, 40 and 41 thereof, from separate annular bodies and assemble them, as shown, by means of screw threads provided thereon and other screws. The front section 39 of the housing 38 has a pair of orifices 44 and 45 therein. The orifices are of a constant diameter from the rear of the section 39 and taper into regions of smaller diameter which extend through the front surface 42 of the housing 38. The orifices 44 and 45 are disposed on either side of the pole portions 35 of the magnetic head 33. These orifices 44 and 45 communicate with an internal recess 46 in the intermediate section 41 of the housing 38. A T-shaped orifice 47 in the rear section 40 of the housing, communicates with the recess 46. Thus, there is provided a continuous system of orifices extending from the rear section of the housing 40 through the intermediate section 41, and the front section 39, which is open at two holes in the front surface 42.

The recess 37 in which the magnetic head 33 is located, may be filled with plastic material to permanently set the head therein or the magnetic head 33 may be constructed as a unit and inserted into the recess 37. Wire leads 51 and 52 which are connected to the coils of the magnetic head 33 are shown extending from the housing 38.

The housing section 39 is supported from a structure 53 which surrounds the front section thereof. This structure 53 is fastened by means of screws 54 to one wall 55 of a walled chamber 56. This one wall 55 of the walled chamber 56 is a two-part structure. One of the parts 57 is provided with a hole or opening 58 therein, through which the rear section 40 of the housing 38 extends into the chamber 56. The diameter of the hole 58 is slightly greater than the diameter of the rear section 40 of the housing. A connector or coupling 59 is threaded into one of the walls of the chamber 56 and provides means for introducing the compressed air from the air lines 27 or 28 into the device.

The housing 38 is supported on the support structure 53 by means of a pair of corrugated annular members 60 and 61 which are fastened on the inner periphery thereof to rings 62 and 63 located at spaced apart positions on the front section 39 of the housing 38. The outer periphery of the corrugated annular members 60 and 61 are fastened to the support structure 53. A strong cement may be used to provide suitable fastening means. The annular members 60 and 61 may be made from porous fiberous material similar to material used to construct loudspeaker voice coil suspension members. By means of the suspension of the housing 38 provided by the annular members 60 and 61, the housing 38 may execute linear displacement over large excursions toward and away from the recording surface 13 of the record disc 11.

In operation, air is introduced under pressure into the chamber 56. This air enters the T-shaped portion 47 of the orifice in the rear section 40 of the housing 38. The air passes through the series of orifices and recesses 46, 44 and 45 and emanates from the front surface 42 of the housing 38. Therefore, the air is exhausted between the adjacent recording surface 13 and the front surface 42. The area of the front surface 42 of the housing 38 is sufficient to permit the air to distribute substantially uniformly, so that a thin film of air is provided between the adjacent surfaces 13 and 42. The air pressure is adjusted so that the expanding air provides opposing forces upon the housing 38 and upon the record disc 11 so as to tend to separate the housing 38 and the head 33 from the recording surface 13. Simultaneously, air is exhausted between the periphery of the opening 58 and the annular surface of the rear section 40 of the housing 38. This exhausted air passes through the porous annular suspension member 60 and into the atmosphere. It will be noted that there is no sliding, frictional contact between the housing and any stationary surface of the chamber 56 or of the support structure 53.

The compressed air also operates to apply forces to the rear surface 43 of the housing 38. The magnitude of these forces is dependent upon the air pressure and the area of the rear surface 43. These forces tend to advance the housing and the head toward the recording surface 13 and will compress the cushion or film of air provided by the exhaustion of air through the orifices 44 and 45. It will be observed that the pneumatic forces upon the rear surface 43 of the housing 38 provides a constant force upon the housing 38 notwithstanding the amount of the displacement toward or away from the recording surface 13. This constant force will counteract the forces due to the exhaustion of air through the orifices 44 and 45 tending to separate the housing 38 from the record disc. The ratio of the areas of the front and rear surfaces 42 and 43 are selected so that an aquilibrium of forces is established when the front surface 42 and the recording surface 13 are separated by a very minute distance, such, for example, as 0.0005 inch. In previous magnetic head spacing devices which operated by the exhaustion of air between the recording medium and the head, such minute spacing was not possible.

When air is merely exhausted between two opposing surfaces, the displacement characteristic is similar to the characteristic represented by the curve illustrated in FIGURE 4. This curve is calibrated on the abscissa thereof, in terms of the head to disc spacing distance, and on the ordinate thereof, in terms of force upon the head. This curve is taken for a given air pressure, and is similar to related curves for different air pressures. It will be noted that, as the head to disc spacing increases, the force upon the head decreases until negative or suctional forces are applied to the head which tend to draw the head toward the disc. Such suctional forces exist over a predetermined distance. For greater and smaller head to disc spacing distances, repelling forces exist between the head and the disc. It is believed that suctional forces result due to decreases in pressure between the head and the disc, because of the Bernoulli effect, which reduces such pressure to less than atmospheric pressure. It will be observed from the curve that at two points the suctional forces tending to draw the head and the disc together are equal to the forces tending to separate the head from the disc. At both of these ponts, which are labeled point A and point B, the head is spaced from the surface of the disc by definite distances. Therefore the head to disc spacing will inherently be either at position A or position B. When the head to disc spacing varies, such as may result from wobble or other irregular motion of the disc, the head will tend to move in response to forces thereupon, so as to reassume, either a spacing corresponding to position A, or a spacing corresponding to position B from the disc. With the present invention, it has been found possible to obtain spacing between the head and the surface of the disc even closer than the spacing obtained by means of the exhaustion of air through the head and between the head and the recording surface. Moreover, the desired spacing will be maintained regardless of wobble or other irregularities of motion of the recording medium. Compensatory motion of the head with motion of the disc may be faster in the case of the present invention, than in the case of systems such as described above. Restoration of the proper predetermined spacing is accomplished practically instantaneously, since there is no friction in a device provided in accordance with the present invention.

It was mentioned above that the forces on the rear of the housing 38 will be balanced against the forces on the front thereof, when the proper distance between the front surface 42 and the recording surface 13 is maintained. It was also mentioned that very close spacings are maintained. Therefore, referring to the curve of FIGURE 4, the surface 42 of the head supporting housing 38 is so close to the recording surface 13 of the disc 11 as to be within the distance represented by position A on the curve and contact between the head and the disc 11. Consequently, forces are exerted on the front of the housing 38 which always tend to separate the housing from the disc. These separational forces are in equilibrium with forces on the rear of the housing. Thus, reliance is not placed on uncontrollable factors, such as are caused by atmospheric pressure and the Bernoulli effect. The possibility that some suctional forces which tend to bring the housing into contact with the disc so as to cause damage thereto, will result is negligible; whereas, in prior systems relying merely on exhaustion of air between a head support structure and a disc, the possibility of intermittent head to disc contact was present. Such intermittent contact would cause considerable distortion in recording and reproduction of signals. It will also be noted that the forces upon the head are greater in the operation of the present invention than in systems where air is merely exhausted between the head and the disc. Thus, greater differentials in forces may be present and result in faster compensatory motion of the head support housing so as to maintain a constant distance between the head and the disc.

Figure 5:
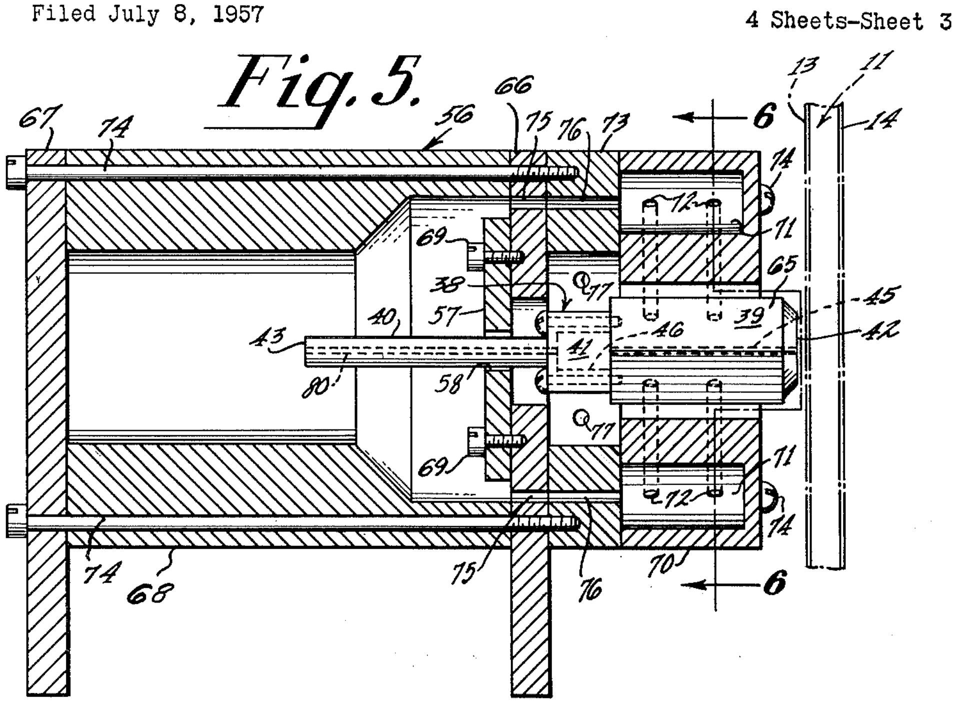
FIGURE 5 is a sectional front view of a device for supporting a magnetic head constructed in accordance with another embodiment of the present invention.

Another embodiment of the magnetic head support device is illustrated in FIGURE 5. FIGURE 5 is a front sectional view of the device whereas FIGURE 3 is a plan sectional view of the device. In many respects, the device illustrated in FIGURE 5 is similar to the device illustrated in FIGURE 3 and like numerals are used to designate like parts. A housing 38 for supporting the magnetic head is shown having the front surface 42 thereof adjacent the recording surface 13 of the record disc 11. This housing 38 is provided with a rear section 40, an intermediate section 41 and the front section 65. The front section 65 is of somewhat different construction than the front section 39 as shown in FIGURE 3. Particularly, the front section 65 has a somewhat diamond shaped cross-section. The purpose in providing a front section for the housing 38 having a diamond rather than an annular shaped cross-section is to provide for improved operation in an air bearing suspension combined in a novel manner in the head support device.

A walled chamber 56 is provided. The front wall 66 and the rear wall 67 are extended below the bottom wall 68 of the chamber 56 so as to provide slide members which may fit into the groove and guide structure 24 and 25 in the panel 10, shown in FIGURE 1. The front wall 66 of the chamber is a two-part structure and includes a part 57 having an annular opening 58 therein through which the rear section 40 of the housing projects into the chamber 56. The part 57 of the walled chamber 56 may be fastened together by means of screws 69.

The air bearing suspension for the housing 38 includes a sleeve 70 surrounding the front section 65 of the housing 38. This sleeve has recesses 71 therein. Also, a plurality of orifices 72 extend from the annular recesses 71 to a gap defined by the outer surface of the front section 65 of the housing 38 and the inner surface of the sleeve 70. The internal construction of the sleeve 70 may be observed by reference to FIGURE 6. A ring member 73 is disposed between the sleeve structure 70 and the front wall 66 of the chamber 56. This ring member 73 may be integral with the sleeve structure 70, if desired. The chamber 56, ring 73 and sleeve 70 may be assembled together by means of traverse bolts 74, some of which extend from the front surface of the sleeve structure 70. The front wall 66 of the chamber and the ring member 73 have a plurality of aligned orifices 75 and 76 therein which connect the recesses 71 in the sleeve 70 with the interior of the chamber 56.

The housing 38 also includes an arrangement of orifices similar to the orifices shown in connection with FIGURE 3. A pair of orifices 44 and 45 are disposed through the front section 65 and are open at the front surface 42 of the housing on either side of the magnetic head 33. These orifices 44 and 45 communicate with the recess 46 in the intermediate section 41 of the housing 38. Another orifice 80 extends directly from the rear surface 43 of the housing to the recess 46 in the intermediate section 41 thereof. Thus, it will be observed that the orifice 80 is of somewhat different shape than the orifice 47 in the rear section 40 of the housing 38, shown in FIGURE 3. An orifice of either shape may be used. It should also be noted that there is a small clearance between the periphery of the rear section 40 and the opening 58 in the part 57 of the front wall 66. Air is introduced under pressure into the chamber 56 by means of a coupling or connector in the manner shown in FIGURE 3.

Figure 6:
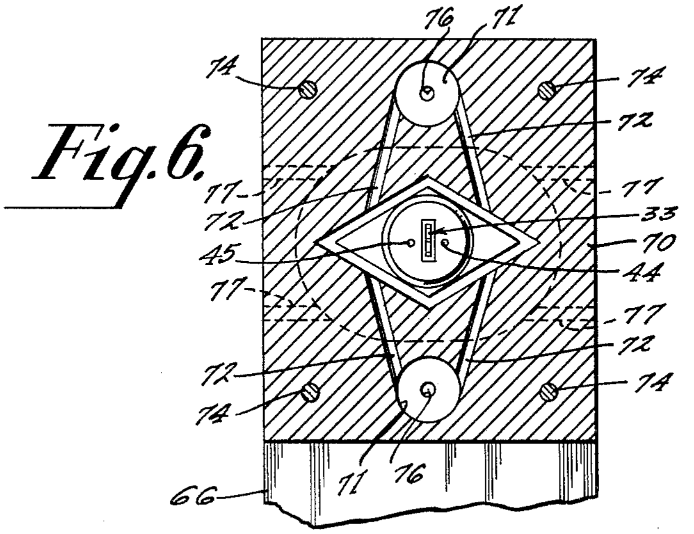
FIGURE 6 is a sectional end view of the device shown in FIGURE 5, the section being taken along the line 6—6 of FIGURE 5, when viewed in the direction of the arrows.

The operation of the head support device illustrated in FIGURES 5 and 6 is similar to the operation of the device shown in FIGURE 3. However, the device of FIGURE 5 has certain advantages. In addition to provisions for making use of a common air stream for providing equilibrium forces on the housing 38 to maintain a predetermined separation between the housing front surface 42 and the recording surface 13 of the disc 11, a common air stream and a common supply of compressed air is utilized for suspending the housing for linear displacements toward and away from the disc 11. Air under pressure enters the system of orifices 80, 46, 44 and 45 in the housing 38 and is exhausted between the front surface 42 of the housing 38 and the recording surface 13 of the disc. Air is exhausted under pressure sufficient to maintain forces between the front surface 42 and the recording surface 13 of the disc 11 so as, at all times, to tend to separate the housing from the disc. Simultaneously, pneumatic forces are applied to the rear surface 43 of the housing to tend to compress the film of air provided between the front surface 42 and the surface 13 of the disc; which forces are in equilibrium at a desired predetermined spacing between the housing and the disc. Moreover, air is supplied from the chamber 56 through the orifices 75 and 76 and the recesses 71 and orifices 72 in the sleeve support structure 70. This air is exhausted in the gap between the surfaces of the front section 65 of the housing 38 and the inner surface of the sleeve 70. The diamond shaped configuration of the interior of the sleeve structure 70 and the front section 65 provides against any rotation of the head and also provides a greater surface than would be provided in the case of an annular structure for presentation against the air which is exhausted through the gap. The operation of air slide bearings such as shown in FIGURE 5 is believed to be understood in the art. For purposes of completeness, however, it may be mentioned that the air bearing operates to maintain the housing 38 centered in the sleeve for frictionless linear displacements over relatively long distances toward and away from the disc 11. It will be appreciated that an air pressure head is built up around the housing 38. When the housing 38 is aligned and centered within the sleeve 70, air escapes all along the periphery of the gap at the front of the sleeve 70 and exerts equal average pressures on all surfaces of the housing 38. However, should the housing 38 move slightly from its centered and aligned position, the frontal area of the gap through which air escapes may change so as to differ at different locations on the periphery of the gap. Thus, the air pressure will change at these different locations and establish pressure differentials along the surfaces of the housing 38. The housing will tend to move under the influence of these pressure differentials so as to restore the equilibrium which exists, when the housing 38 is centered and aligned within the sleeve 70.

The air from the chamber also escapes through the gap between the periphery of the opening 58 and the surface of the rear section 40 of the housing 38 which is located within the opening. The air escaping through the opening 58 passes through the chamber around the intermediate section 41 and through a number of orifices 77 connecting this chamber with the atmosphere. The chamber around the intermediate section 41 is maintained at atmospheric pressure to minimize air pressure forces on the back surfaces of the intermediate and front sections of the housing 38.

Figure 7:
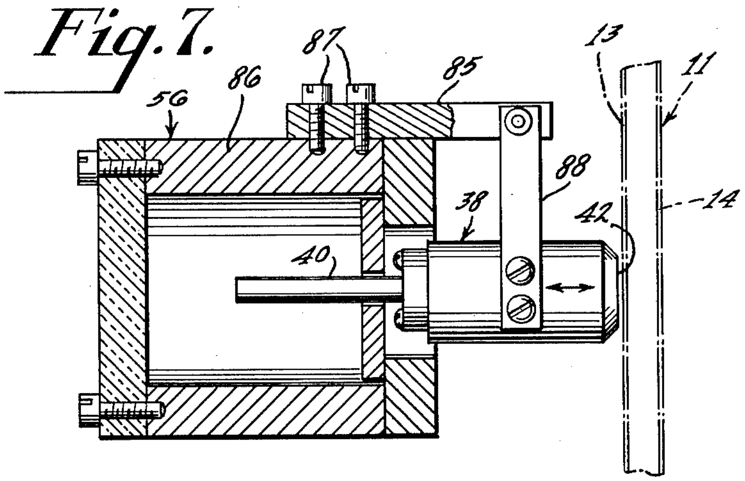
FIGURE 7 is a sectional front view of a device for supporting a magnetic head constructed in accordance with still another embodiment of the present invention.

Another embodiment of the head support device provided by the present invention is shown in FIGURE 7. The device of FIGURE 7 is substantially similar to the devices illustrated in connection with FIGURES 1 to 6 and includes a housing 38 containing a magnetic head exposed therefrom at the front surface 42 thereof. The head will, therefore, be disposed opposite the recording surface 13 of the disc record 11. The chamber 56 provided by a plurality of walls cooperates with the rear section 40 of the housing in the manner heretofore described in detail. The device illustrated in FIGURE 7 has a somewhat different means for suspending the housing for linear displacements toward and away from the disc 11. This means includes a support structure 85 fastened to the top wall 86 of the chamber 56 by means of screws 87. A lever member 88 is pivotally mounted at one end thereof from the support structure 85 and is fixedly mounted near the other end thereof to the housing 38. For small displacements toward and away from the disc 11, this lever or pendulum type of support structure may be found suitable.

Figure 8:
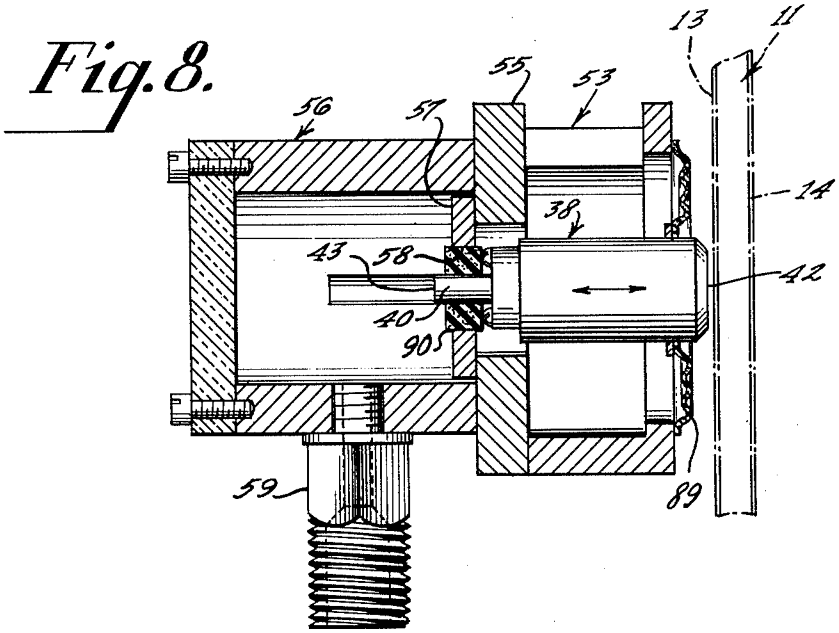
FIGURE 8 is a sectional plan view of a device for supporting a magnetic head constructed in accordance with still another embodiment of the present invention.

Another embodiment of the head support device, constructed in accordance with the invention, is illustrated in FIGURE 8. The illustrated device is, in many respects, similar to the foregoing illustrated and described devices. The device illustrated in FIGURE 8 includes a housing 38 for carrying the magnetic head, a chamber 56, a support structure 53 surrounding the housing 38 and a coupling or connector 59 for introducing a compressible fluid medium such as air into the chamber. A system of orifices is provided from the rear surfaces 43 to the front surface 42 of the housing 38 in the manner similar to that described in connection with FIGURE 5 or FIGURE 3. The head support device is supported for linear displacements toward or away from the recording surface 13 of the disc 11 to provide for a minute spacing therebetween, which will be maintained irrespective of slight irregularities in the motion of the disc.

The embodiment illustrated in FIGURE 8 provides features of simplicity in the suspension for the housing 38 in the chamber 56 and by the support structure 53. This suspension means lends itself toward reducing the cost of manufacture of the device and may be suitable when the housing is expected to execute small displacements toward and away from the disc. To this end, a single corrugated suspension member 89, which is similar to the suspension member 61 illustrated in connection with FIGURE 3, is disposed toward the front of the housing 38 and suspends the housing from the support structure 53. The rear section 40 of the head support structure 38 is maintained centered in the opening 58 of the part 57 of the front wall 55 for the chamber 56 by means of a washer 90. This washer may be constructed from a resilient material, such as soft rubber. It will be seen that the washer 90 is sufficiently flexible to suspend the housing in proper centered and aligned relationship within the chamber and the support structure. Moreover, the washer 90 is sufficiently yieldable to permit small displacements of the housing toward and away from the disc 11. Since the rear section 40 of the housing 38 is firmly supported by means of a resilient washer 90, only a single annular suspension member 89 is required. The use of a washer such as the washer 90 prevents the escape of significant amounts of air through the opening 58. Thus, the air supplied to the chamber is conserved. Therefore, a compressed air supply of smaller capacity, than may be suitable for use with the head support devices illustrated in connection with the foregoing figures, may be used for operating the head support device illustrated in FIGURE 8.

There has been described novel devices for use in a magnetic recording system, which are capable of supporting the magnetic head in closer spaced relationship to a recording surface of a record medium than has been heretofore possible. Moreover, wear on the magnetic head is eliminated by means which prevent any possible contact between the head and the recording medium, and also by the elimination of frictional sliding contact within the device for supporting the head through the use of air bearings.

What is claimed is:

1. In a recording system utilizing a recording medium on which signals are adapted to be magnetically recorded, a transducer for scanning said medium to record and reproduce signals thereon, said transducer having a front portion disposed opposite from said medium and a rear portion, a housing for said transducer, said front portion of said transducer being exposed to said record from one end of said housing, said housing having an orifice extending therethrough from said one end to said opposite end thereof, means for exhausting a pressurized compressible fluid through said orifice for establishing oppositely directed forces between said front portion of said transducer and said recording medium varying in magnitude in accordance with the distance between said front portion and said recording medium, said last named means also including means for admitting said fluid into the opening of said orifice on said opposite end of said transducer housing for establishing a constant force upon said rear portion of said transducer in a direction opposite to said force upon said front portion of said transducer, and means for supporting said transducer for displacement toward and away from said recording medium, said supporting means comprising a sheet of flexible material having corrugations and a central opening therein, means for mounting said transducer in said opening, a stationary support structure surrounding said transducer, and means for securing said sheet to said support structure at the outer periphery thereof, said force applied to said rear portion of said transducer having a certain value to provide for equilibrium thereof with said force on said front portion of said transducer when said distance between said recording medium and said front portion is equal to a predetermined distance.

2. In a system for utilizing a recording medium on which signals are adapted to be magnetically recorded, a magnetic head having a signal gap in one portion thereof, a housing for supporting said magnetic head with said signal gap disposed opposite to said recording medium, said housing being a unitary structure having a forward section and a rear section, the end of said rear section and the end of said front section being disposed at opposite ends of said housing, said pole section of said magnetic head being exposed from said end of said front portion of said housing, said housing having an orifice extending therethrough from said rear section to said end of said front section thereof, a walled chamber, one of said walls having an opening therein, the diameter of said opening being slightly greater than the diameter of said rear portion, a support structure secured to said chamber walls, flexible means for supporting said housing for displacement toward and away from said recording medium with the rear portion thereof extending through said opening into said housing, and means for introducing fluid medium under pressure into said chamber, said fluid medium being exhausted between the clearance between the diameter of said opening and the diameter of said rear portion whereby to provide a bearing for said support structure.

3. A system using a magnetic recording medium comprising a magnetic head having pole portions which define a signal gap, a housing containing said magnetic head, said housing having front and rear sections, opposite end surfaces of said housing being disposed at the ends of said front and rear sections thereof, said pole portions of said head being exposed from said front end of said housing adjacent said recording medium, a walled chamber having an opening therein, said rear section of said housing extending through said opening into said chamber, a sleeve secured to the wall of said chamber having said opening therein and surrounding said front section of said housing, the inner surface of said sleeve being spaced from the surface of said front section of said housing so as to provide a gap therebetween, said sleeve having at least one orifice therein extending from said inner surface thereof, one of the walls of said chamber having an orifice therein, said orifice in said wall communicating said chamber with said orifice in said sleeve, said recording medium being disposed opposite from said front surface of said housing, said housing having an orifice therein extending from said rear portion thereof through said front surface thereof, and means for introducing a compressible fluid under pressure into said chamber.

4. In a system utilizing a recording medium on which signals are adapted to be magnetically recorded, a transducer for scanning said medium to record and reproduce signals thereon, said transducer having a front portion disposed opposite from said medium and a rear portion, means including a film of pressurized fluid for establishing oppositely directed forces between said front portion of said transducer and said recording medium varying in magnitude in accordance with the distance between said front portion and said recording medium, means for establishing a constant force upon said rear portion of said transducer in a direction opposite to said forces upon said front portion of said transducer, means for supporting said transducer for displacement towards and away from said recording medium, said supporting means comprising a sheet of flexible material having corrugations and a central opening therein, means for mounting said transducer in said opening, a stationary support structure surrounding said transducer, and means for securing said sheet to said support structure at the outer periphery thereof, said force applied to said rear portion of said transducer having a certain value to provide for equilibrium thereof with said force on said front portion of said transducer when said distance between said recording medium and said front portion is equal to a predetermined distance.

5. A magnetic recording system comprising a magnetic recording medium constituted of a substantially rigid body having a recording surface on which signals are adapted to be magnetically recorded, a magnetic transducer for scanning said surface for recording and reproducing signals thereon, said magnetic transducer having a front surface disposed opposite from said recording surface of said body so as to be separated therefrom by a predetermined distance, a structure in which said transducer is mounted having a pair of opposite ends, said front surface being exposed from said structure at one of said ends thereof, means for applying a force of constant magnitude upon said other end of said mounting structure to advance said mounting structure and said transducer toward said recording surface comprising a chamber having an opening in one of said walls into which the other end of said mounting structure extends, the cross-sectional dimensions of said other ends of said mounting structure being similar to and slightly smaller than corresponding cross-sectional dimensions of said opening whereby to provide clearance between the wall of said chamber having said opening and said other end of said mounting structure, means for introducing a compressible fluid medium under pressure into said chamber whereby to tend to force said mounting structure out of said chamber, said compressible fluid medium being exhausted through said clearance between said chamber wall and said opening to provide a bearing for said mounting structure, means including a film of pressurized fluid to establish oppositely directed forces between said one end of said transducer mounting structure and said recording surface to tend to force said other end of said mounting structure into said chamber, said last-named means providing forces varying in magnitude dependent upon the separation between said recording surface and said one end of said transducer mounting structure, and said forces on said opposite ends being equal when said distance between said front surface of said transducer and said recording surface is said predetermined distance.

6. A magnetic recording system comprising a magnetic recording medium constituted of a substantially rigid body having a recording surface on which signals are adapted to be magnetically recorded, a magnetic transducer for scanning said surface for recording and reproducing signals thereon, said magnetic transducer having a front surface disposed opposite from said recording surface of said body so as to be separated therefrom by a predetermined distance, a structure in which said transducer is mounted having a pair of opposite ends, said front surface being exposed from said structure at one of said ends thereof, means for applying a force of constant magnitude upon said other end of said mounting structure to advance said mounting structure and said transducer toward said recording surface comprising a chamber having an opening in one of said walls into whcih the other end of said mounting structure extends, a body of resilient material in said opening disposed between said other end of said mounting structure and the periphery of the walls of said chamber defining said opening and supporting said other end in said chamber, means including a film of pressurized fluid to establish oppositely directed forces between said one end of said transducer mounting structure and said recording surface to tend to force said other end of said mounting structure into said chamber, said last-named means providing forces varying in magnitude dependent upon the separation between said recording surface and said one end of said transducer mounting structure, and said forces on said opposite ends being equal when said distance between said front surface of said transducer and said recording surface is said predetermined distance.

7. In a system utilizing a recording medium on which signals are adapted to be magnetically recorded, a transducer for scanning said medium to record and reproduce signals thereon, said transducer having a front portion disposed opposite from said medium and a rear portion, means including a film of pressurized fluid for establishing oppositely directed forces between said front portion of said transducer and said recording medium varying in magnitude in accordance with the distance between said front portion and said recording medium, means for establishing a constant force upon said rear portion of said transducer in a direction opposite to said force upon said front portion of said transducer, means for supporting said transducer for displacement towards and away from said recording medium and comprising a stationary structure, a lever pivotally mounted adjacent one end thereof to said stationary structure, means for securing said lever to said transducer adjacent the opposite end thereof, said force applied to said rear portion of said transducer having a certain value to provide for equilibrium thereof with said force on said front portion of said transducer when said distance between said recording medium and said front portion is equal to a predetermined distance.

References Cited in the file of this patent

UNITED STATES PATENTS

| | | |
|---|---|---|
| 1,990,548 | Keller et al. | Feb. 12, 1935 |
| 2,603,539 | Brewster | July 15, 1952 |
| 2,612,566 | Anderson et al. | Sept. 30, 1952 |
| 2,772,135 | Hollabaugh | Nov. 27, 1956 |
| 2,780,230 | Freeman | Feb. 5, 1957 |
| 2,813,519 | Persson et al. | Nov. 19, 1957 |
| 2,862,781 | Baumeister | Dec. 2, 1958 |
| 2,913,536 | Fuller et al. | Nov. 17, 1959 |
| 2,928,709 | Baumeister | Mar. 15, 1960 |

FOREIGN PATENTS

| | | |
|---|---|---|
| 764,434 | Great Britain | Dec. 28, 1956 |